May 15, 1962  R. GONZALEZ  3,034,376
MULTI-PURPOSE POWER-DRIVEN HAND TOOL
Filed Feb. 14, 1958  2 Sheets-Sheet 1
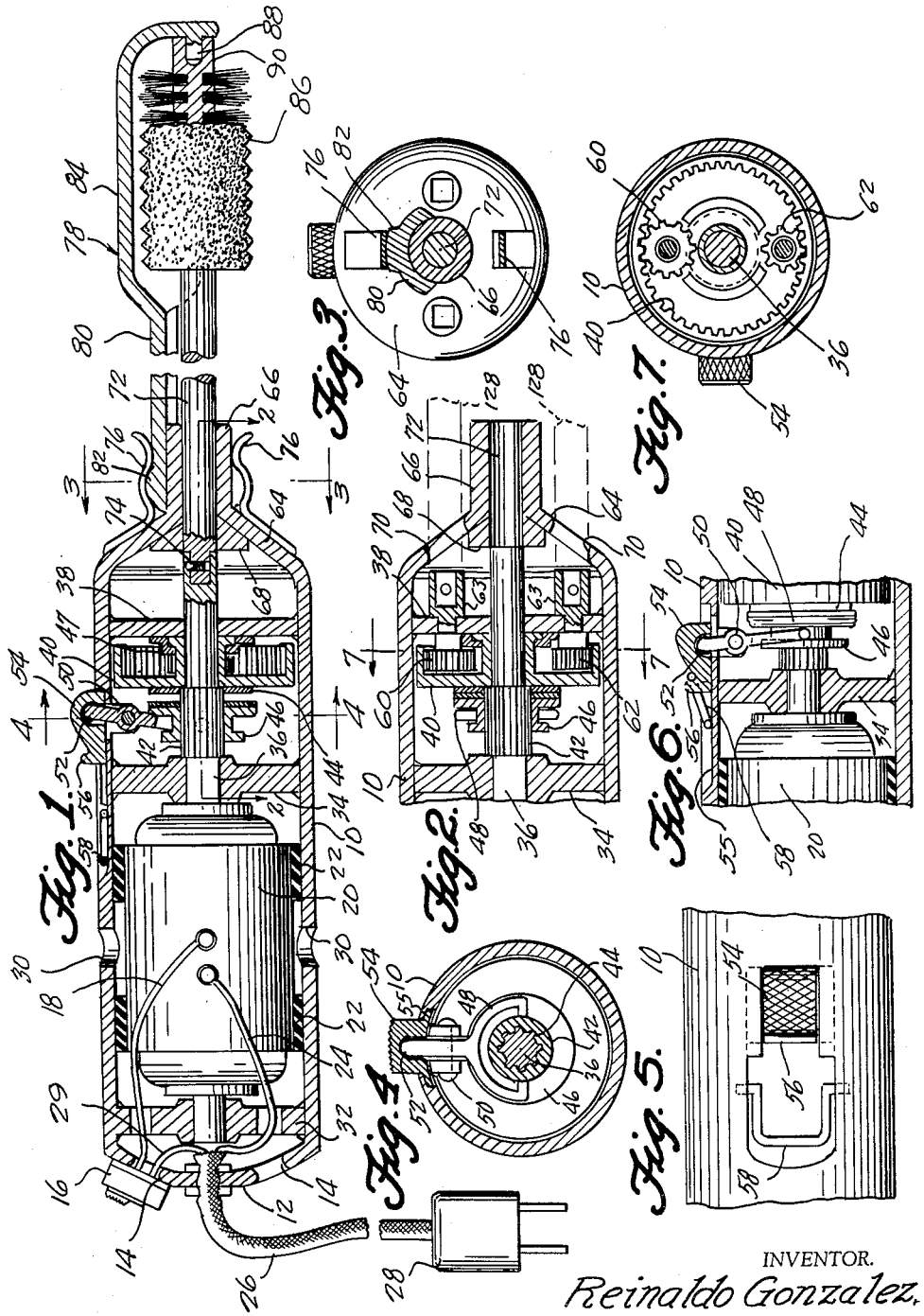
INVENTOR.
Reinaldo Gonzalez,
BY
McMorrow, Berman + Davidson
ATTORNEYS

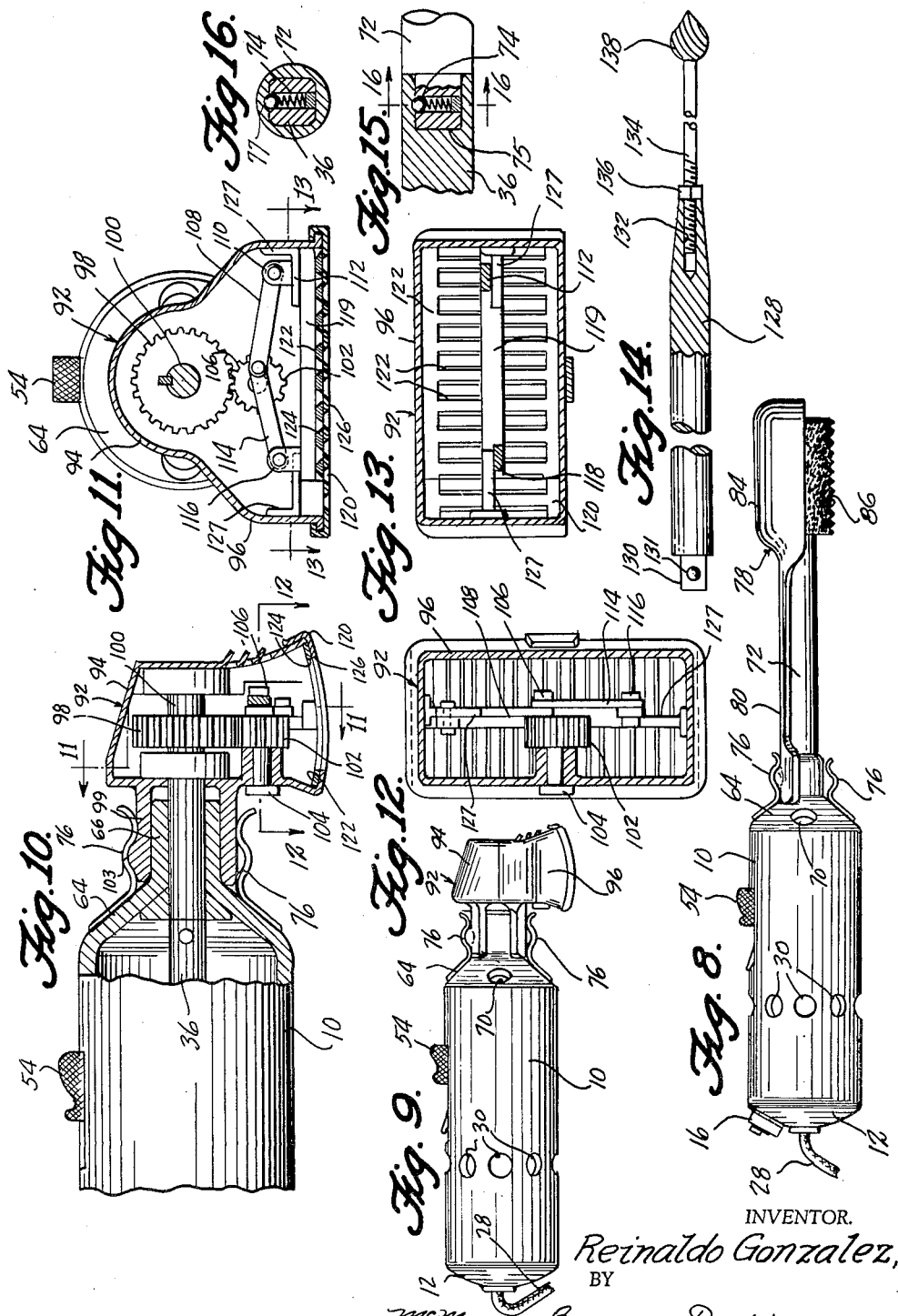

United States Patent Office 3,034,376
Patented May 15, 1962

3,034,376
MULTI-PURPOSE POWER-DRIVEN HAND TOOL
Reinaldo Gonzalez, P.O. Box 841, Mastic, N.Y.
Filed Feb. 14, 1958, Ser. No. 715,290
6 Claims. (Cl. 74—665)

This invention relates generally to multi-purpose tools, and more particularly has reference to a power-driven tool that will be so designed as to permit, through the use of selected attachments, the tool to be employed as a shaver, manicuring set, toothbrush, gum massager, light duty drill, scraping set for dentistry, etc.

The main object of the present invention is to provide a tool of the character described that will be capable of manufacture at relatively low cost, will nevertheless be designed for discharging a multiplicity of functions, will be adapted for swift attachment or detachment of selected working heads, and will be compact and efficient in operation.

Another object of the invention is to provide a tool of the character described that will be capable of being manipulated with maximum ease and speed, will be adapted to make use of conventional electric power sources, will be designed to facilitate assembly and disassembly, and will be so formed as to be capable of operation at a relatively low cost, over a long period of time.

Other objects will appear from the following description, the claims appended thereto, and from the annexed drawings in which like reference characters designate like parts throughout the several views and wherein:

FIGURE 1 is a longitudinal sectional view through a tool formed according to the present invention, adapted for use as a power-driven toothbrush;

FIGURE 2 is a fragmentary longitudinal sectional view substantially on line 2—2 of FIGURE 1;

FIGURE 3 is a transverse sectional view substantially on line 3—3 of FIGURE 1;

FIGURE 4 is a transverse sectional view substantially on line 4—4 of FIGURE 1;

FIGURE 5 is a fragmentary top plan view of the device;

FIGURE 6 is a fragmentary longitudinal sectional view on the same cutting plane as FIGURE 1, showing the clutch engaged;

FIGURE 7 is a transverse sectional view substantially on line 7—7 of FIGURE 2;

FIGURE 8 is a reduced elevational view of the device shown in FIGURE 1, prepared for use as a toothbrush;

FIGURE 9 is a view like FIGURE 8 in which the device has been readied for use as an electric shaver;

FIGURE 10 is a view on the same scale as FIGURE 1, showing the device fragmentarily, partly in side elevation and partly in longitudinal section, equipped with the electric shaver attachment shown in FIGURE 9, said attachment being shown in section;

FIGURE 11 is a transverse sectional view on the same scale as FIGURE 10, taken substantially on line 11—11 of FIGURE 10;

FIGURE 12 is a sectional veiw on the same scale as FIGURE 10, taken substantially on line 12—12 of FIGURE 10;

FIGURE 13 is a sectional view on the same scale as FIGURE 11, taken substantially on line 13—13 of FIGURE 11;

FIGURE 14 is a view partly in elevation and partly in longitudinal section, showing a scraper or dental burr attachment;

FIGURE 15 is a view on an enlarged scale, partly in elevation and partly in longtiudinal section, showing the detail of the coupling of the attachments with the drive shaft; and FIGURE 16 is a view on the same scale as FIGURE 15, taken substantially on line 16—16 of FIGURE 15.

Referring to the drawing in detail, the reference numeral 10 designates an elongated, hollow casing, having a concavo-convex rear end wall 12 rigidly secured to the body portion of the casing, and arranged with its convex surface facing outwardly. End wall 12 has diametrically opposed openings 14, one of which comprises a venting opening to permit the dissipation of heat that may accumulate within the casing. Mounted in position over the other opening 14 is a switch 16, from one terminal of which extends a lead 18 connected to one terminal of an electric motor 20 having a resiliently cushioned mounting in the rear end portion of the casing, through the provision of spacer bands 22 interposed between the motor housing and the casing 10. Extending from the other terminal of the motor is a lead 24, which comprises one lead of a convenience cord 26 provided with an electric plug 28. The other wire of the cord 26 has been designated at 29 and extends to the other terminal of the switch 16, so that whenever the switch is moved to "on" position, the motor is energized. Switch 16 is preferably a rheostatic switch.

Also formed in the casing, adjacent the motor, are angularly spaced openings 30, which comprises additional vent openings for dissipation of motor heat.

In close proximity to opposite ends of the motor there are fixedly mounted, within the casing, transverse partitions 32, 34 respectively, having coaxially aligned bearing openings receiving the shaft 36 of the motor. Shaft 36 projects forwardly from the casing of the motor a substantial distance, and is journaled, forwardly of the partition 34, in a bearing plate 38 fixedly mounted within the casing in position extending transversely of the casing.

In close proximity to the bearing plate 38, in the space between plate 38 and partition 34, is a peripherally flanged, internally toothed ring gear 40 in the form of a disc having a forwardly directed flange on the inner surface of which the gear teeth are formed. The hub of the ring gear 40 receives shaft 36, and the ring gear is free to turn in respect to the shaft.

Immediately rearwardly from the ring gear 40, shaft 36 is provided with a spline section 42, on which slides a complementarily splined, circumferentially grooved clutch disc 46, movable between the disengaged position thereof shown in FIGURE 1 and the engaged position shown in FIGURE 2. The clutch disc has a clutch facing of friction-producing material, in confronting relation to a clutch face 44 cemented or otherwise secured to the face of the ring gear. The ring gear is mounted for rotation on a bearing 47 provided upon the plate 38, so that the ring gear will not shift axially of the shaft 36.

Since the clutch disc 46 is splined correspondingly to the spline ribs of the section 42, it is required to turn with the shaft 36, though being free to move axially of the shaft between the FIGURE 1 and FIGURE 2 positions.

For the purpose of operating the clutch disc between the two positions, there is provided a disc shifting assembly including a transverse clamp 50 engaged at its ends in suitable lugs provided in the wall of casing 10. Rockable upon the pin 50 is a shifting lever 52, swingable between the FIGURE 1 and FIGURE 6 positions. At its inner end, the shifting lever 52 is bifurcated, with the fork arms 48 thereof straddling the clutch disc, and loosely engaged in the circumferential groove of the clutch disc as shown in FIGURE 6.

At its outer end, the shafting lever projects through a slot of casing 10, and is loosely engaged in an internal recess of a shifter button 54 slidably mounted in an undercut slot 55 (see FIGURE 4) of casing 10. Button 54, at its rear end, has a transverse rib or lug 56, and a pivoted, U-shaped keeper 58 is swingably mounted in slot 55 for movement between the FIGURE 1 and FIGURE 6 positions thereof. Keeper 58 when in its FIGURE 6 position engages over the rib 56, so as to lock the button in its rearwardly moved position. At this time, lever 52 has been pivoted as shown in FIGURE 6 to a position effective to move disc 46 against clutch face 44, and hold disc 46 in firm, frictional contact with the clutch face.

Therefore, when the clutch is engaged, the ring gear will rotate with the shaft 36.

Designated at 60, 62 are driven gears (see FIGURES 2 and 7). Gear 60 is greater in diameter than gear 62, and both the gears are in mesh with the ring gear 40.

By reason of this arrangement, whenever the clutch is engaged, the gears 60, 62 will rotate. Gears 60, 62 are integral or otherwise made rigid with stub shafts journaled in the plate 38, and forwardly of plate 38, said stub shafts have axially recessed coupling heads 63 the particular construction of which will be described in detail hereinafter.

Coupling heads 63 are diametrically opposed, and are spaced laterally from the shaft 36, though being rotated on axes parallel to that of the shaft.

Forwardly of the coupling heads 63, casing 10 has a tapered front end wall 64, centrally formed with an axial projection or extension 66. A bushing 68 is fixedly secured to the inner surface of the wall 64, in a central position.

Diametrically opposed openings 70 are formed in wall 64, for the purpose of receiving the shaft of a selected attachment to permit rotation of said shaft at a selected speed.

Designated generally at 78 in FIGURE 1 is a toothbrush attachment. This includes an elongated shaft 72, one end of which has a non-circular, axial projection engaging in a complementarily formed female coupling head formed upon the end of shaft 36. The details of this construction are shown to particular advantage in FIGURES 15 and 16. As will be noted, a spring-loaded ball detent is provided in the reduced, non-circular extension 75 of the shaft 72, said detent being releasably engageable in a ball-receiving recess 77 formed in the wall of the axial recess of the shaft 36.

In this way, the shaft 72 may be coupled to the shaft 36 in coaxial alignment therewith, and in a manner to be linked to shaft 36 in direct drive, responsive merely to axial movement of the shaft 72 into the casing 10. The shaft 72 can be detached from the shaft 36 with equal ease, by axial movement to the right in FIGURE 1.

Fixedly secured to and projecting forwardly from the wall 64, at opposite sides of the axial extension 66, are oppositely but identically formed, compoundly curved leaf spring retainers 76, and as best shown in FIGURES 1 and 3, an elongated channeled casing 80 of the attachment 78 is adapted at one end to fit over the axial extension 66, and has at this end a lug 82 engageable with either of the spring retainers 76.

At its other, forward end, casing 80 is integral with a longitudinally extending, enlarged, channel-shaped mouth guard 84, within which rotates a cylindrically shaped brush member 86 comprising a plurality of bristle tufts embedded in the shaft 72. A bearing lug 88 is provided on the inner surface of the forward wall of the guard 84, and engages in a recess provided in the front end of the shaft 72.

The front end portion of the shaft 72 has been designated 90, and can be either integral with the remainder of the shaft 72 or alternatively can comprise a separate piece which can be detached in the event the bristles need replacement.

In any event, it will be observed from the construction so far described that assuming that one were to desire to use the tool as a power-driven tooth-brush, it is merely necessary to engage plug 28 in a suitable receptacle of a power supply, not shown. The toothbrush attachment 78 is secured to the main portion of the device, by engaging lug 82 with a spring 76, and by simultaneously engaging the shaft 72 in the female coupling head at the front end of the shaft 36. Switch 16 is thrown to an "on" position, but the clutch can be left disengaged when the shaft 72 is secured directly to the front end of the shaft 36. At this time, the device is operating on "low speed," that is, with the shaft 36 in direct drive to shaft 72, shaft 72 is operated at a predetermined, comparatively lower r.p.m. Switch 16, being a rheostatic switch, can permit rotation of the shaft 72 at various speeds, within the "low speed" range, which range is provided whenever a shaft is coupled in coaxial alignment to and in direct drive with the shaft 36.

The power-driven toothbrush, then, can be used to effectively clean the teeth, although of course a brush of the type shown in FIGURE 1 could have various other purposes, if desired. It has, in other words, general utility as a power-driven rotary brush of small size.

Assuming now that one were to desire to use the device as an electric shaver, there would be used an attachment 92 shown in FIGURES 9-13. This attachment includes a housing 94 which is approximately bell-shaped, as shown in FIGURES 11 and 9, that is, the device flares in a downwardly direction as at 96. A drive gear 98 is keyed to a shaft 100 journaled in housing 94, and is in mesh with a smaller, driven gear 102 (FIGURE 11) carried by a stub shaft 104 journaled in a bearing mounted upon the back wall of housing 94 (FIGURE 10). Pivotally connected at 106 to the marginal portion of the pinion 102 are oppositely extending pitmans, one of which has been designated 108 and is pivotally connected at 110 to a connecting bracket 112.

The other pitman 114 is pivotally connected at 116 to a connecting bracket 118. Brackets 112, 118 are extended upwardly from and are rigid with the opposite ends of an elongated connector rib 119.

A stationary cutter plate 120 has flanged ends secured to correspondingly flanged ends of the flared portion 96 of the shaver housing. The plate 120 is in contact with a movable cutter plate 122. Plate 122 has transverse slots 124 the opposite edges of which are sharpened, and similar slots 126 are formed in the stationary cutter plates 120. The plate 122 is rigid with the bar 119 which extends the full length of the plate 122. As a result, on rotation of the gears 98, 102, the rotary motion of the gear 102 will be translated into a high speed reciprocation of the cutter plate 122.

Designated at 127 (FIGURES 11 and 13) are guide bars in contact with the connecting brackets 112, 118, said guide bars being secured fixedly to opposite walls of the shaver housing and projecting toward each other within said housing.

Referring to FIGURE 10, the shaver is secured to the front end of the casing 10 in the same manner as the toothbrush attachment, that is, the power shaver has a tubular socket 99 receiving extension 66 and formed with at least one lug 103 engageable by a selected spring 76.

Further, the shaft 100 has the same type of reduced coupling extension as shown in FIGURE 15 for the shaft 72.

Referring now to FIGURE 14, there is here shown another attachment in the form of an elongated shaft 128 having a reduced, non-circular extension 130 provided with a ball detent 131, exactly as shown in FIGURE 15. The shaft 129, at its other end, is tapered, and has an elongated, threaded, axial recess 132 in which is threadedly engaged an elongated rod 134. Threaded on rod 134 is a nut 136 which can be turned home against the tapered end the shaft 128 to block the rod 134 against accidental rotation in respect to the shaft 128. On the outer end of the rod 134 there is provided a scraper head or dental burr and this roughened head can be used for any of various purposes, for example for the purpose of manicuring fingernails. The burr can also be used for cleaning teeth, assuming that it would be provided with a proper surface, and in addition, small drilling burrs could be used. It would be understood that a full set of burrs could be provided, interchangeable with one another in the shaft 128.

Shaft 128 could if desired be coupled in direct drive with shaft 36. Alternatively, shaft 128 could be extended through either one of the openings 70 shown in FIGURE 2. When extended through an opening 70, the shaft 128 could be journaled in said opening, and would be coupled to a selected one of the coupling heads 63. Assuming, for example, that it is desired to operate a shaft at high speed, one would couple it to that head 63 that rotates with the smaller pinion 62. If one desires to rotate a shaft at intermediate speed, it would be coupled to the head 63 of the pinion 60. If low speed rotation is desired, the shaft would be coupled directly to the shaft 36. Regardless of which coupling is selected, the rheostatic switch can be employed for the purpose of providing for variations within the low, intermediate, and high speed range, or alternatively, can be used to supply added power in the event resistance is encountered to rotation of the shaft at a selected speed.

Of course, only a few of the various uses and attachments have been described herein, and it is to be understood that many others may be encompassed within the invention, within the scope of the appended claims.

It is believed apparent that the invention is not necessarily confined to the specific use or uses thereof described above since it may be utilized for any purpose to which it may be suited. Nor is the invention to be necessarily limited to the specific construction illustrated and described, since such construction is only intended to be illustrative of the principles, it being considered that the invention comprehends any minor change in construction that may permitted within the scope of the appended claims.

What is claimed is:

1. A power hand tool comprising a hollow casing having a side wall front and rear ends, a motor mounted in the casing at the rear end thereof, said motor having a forwardly extending shaft, a transverse bearing wall in said casing between the motor and the front end of the casing through which said shaft is journaled, a transverse bearing plate in the casing between and spaced from said bearing wall and the front end of the casing, through which said shaft is journaled, a ring gear journaled on said shaft immediately behind said bearing plate, said ring gear having an internally toothed rim and a plate, means interposed between the bearing plate and the ring gear preventing axial movement of the ring gear along the shaft, diametrically opposed drive gears of different diameters having forwardly extending stub shafts, said gears being disposed within the ring gear and in mesh with its toothed rim and the stub shafts being journaled through said bearing plate, and attachment shaft connecting means fixed on the stub shafts and positioned forwardly of the bearing plate, and means for releasably connecting said ring gear for rotation with said shaft.

2. A power hand tool comprising a hollow casing having a side wall front and rear ends, a motor mounted in the casing at the rear end thereof, said motor having a forwardly extending shaft, a transverse bearing wall in said casing between the motor and the front end of the casing through which said shaft is journaled, a transverse bearing plate in the casoing between and spaced from said bearing wall and the front end of the casing through which said shaft is journaled, a ring gear journaled on said shaft immediately behind said bearing plate, said ring gear having an internally toothed rim and a plate, means interposed between the bearing plate and the ring gear preventing axial movement of the ring gear along the shaft, diametrically opposed drive gears of different diameters having forwardly extending stub shafts, said gears being disposed within the ring gear and in mesh with its toothed rim and the stub shafts being journaled through said bearing plate, and attachment shaft connecting means fixed on the stub shafts and positioned forwardly of the bearing plate, and means for releasably connecting said ring gear for rotation with said shaft, said connecting means comprising a clutch disc slidably splined on said shaft to be moved between said bearing wall and said ring gear, a friction clutch face on the forward end of the clutch disc, a friction clutch plate on the plate of the ring gear, and operating means mounted on the casing side wall and engaged with the clutch disc.

3. A power tool comprising a support, a plurality of driven shafts journalled on said support and having first means for individually connecting said shafts to tools, a power driven shaft, and second means for connecting the driven shafts to the power driven shaft to rotate at different speeds, said second means comprising a ring gear fixed on the power driven shaft and gears of different diameters on said driven shafts in mesh with the ring gear.

4. A power tool comprising a support, a plurality of driven shafts journalled on said support and having first means for individually connecting said shafts to tools, a power driven shaft, and second means for connecting the driven shafts to the power driven shaft to rotate at different speeds, said second means comprising a ring gear fixed on the power driven shaft and gear of different diameters on said driven shafts in mesh with the ring gear, a tubular bearing fixed on said support in line with and spaced from said power driven shaft, an attachment having a sleeve engaged on said tubular bearing and a shaft journalled in and extending through said tubular bearing, and means for separably connecting the attachment shaft to the power driven shaft, and means releasably securing the sleeve on the tubular bearing.

5. In a power hand tool, a hollow casing having a side wall, a motor operated drive shaft journalled within the casing and having a ring gear rotatably circumposed thereon and retained against endwise movement along the drive shaft, a plurality of different diameter gears journalled within the casing and in mesh with said ring gear, said ring gear having a clutch face fixed thereto, a clutch disc splined on and movable along the driven shaft, said casing side wall having a longitudinal slot, an external button slidably confined in said slot, a lever pivoted intermediate its ends on the side wall, said lever having an outer end connected to said button and an inner end operatively connected to the clutch disc, and means for individually connecting attachment shafts to said gears.

6. In a power hand tool, a hollow casing having a side wall, a motor operated drive shaft journalled within the casing and having a ring gear rotatably circumposed thereon and retained against endwise movement along the drive shaft, a plurality of different diameter gears journalled within the casing and in mesh with said ring gear, said ring gear having a clutch face fixed thereto, a clutch disc splined on and movable along the driven shaft, said casing side wall having a longitudinal slot, an external button slidably confined in said slot, a lever pivoted intermediate its ends on the side wall, said lever having an outer end connected to said button and an inner end operatively connected to the clutch disc, and means for individually connecting attachment shafts to said gears, and a detent bail pivoted on the casing side wall and extending across the slot, said bail being swingable from an inoperative position to retaining engagement with said button only in the clutch disc engaging position of the button.

(References on following page)

References Cited in the file of this patent

UNITED STATES PATENTS

| | | |
|---|---|---|
| 1,108,991 | Hyson | Sept. 1, 1914 |
| 1,536,157 | Slack | May 5, 1925 |
| 1,650,911 | Schneider | Nov. 29, 1927 |
| 1,691,200 | Krug | Nov. 13, 1928 |
| 1,864,549 | Paul | June 28, 1932 |
| 2,092,104 | Bowden | Sept. 7, 1937 |
| 2,118,734 | McGowan | May 24, 1938 |
| 2,118,983 | Redmond | May 31, 1938 |
| 2,150,343 | Schieber | Mar. 14, 1939 |
| 2,161,300 | Kolstad | June 6, 1939 |
| 2,195,100 | Smith | Mar. 26, 1940 |
| 2,403,094 | Lear | July 2, 1946 |
| 2,483,905 | Hubmann | Oct. 4, 1949 |
| 2,534,951 | Cargill | Dec. 19, 1950 |
| 2,742,797 | Perham | Aug. 24, 1956 |
| 2,770,138 | Ripple | Nov. 13, 1956 |
| 2,900,844 | Kalilec | Aug. 25, 1959 |

FOREIGN PATENTS

| | | |
|---|---|---|
| 529,641 | Italy | June 24, 1955 |